H. H. CAMP, B. J. MAYNARD & B. P. WISE.
BENCH.
APPLICATION FILED OCT. 4, 1910.
1,000,070.
Patented Aug. 8, 1911.
2 SHEETS—SHEET 1.
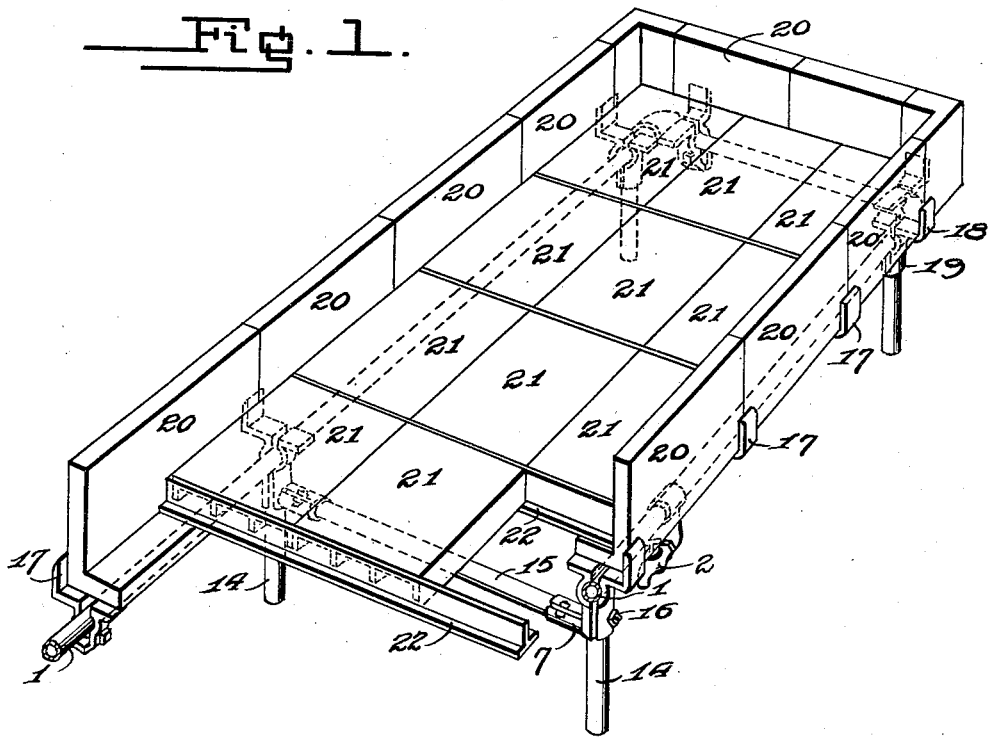
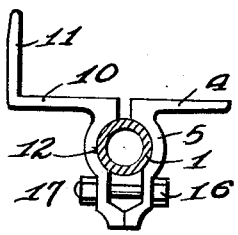
Witnesses
Inventors
Henry H. Camp,
Burton J. Maynard
and Byron P. Wise
By
Their Attorney
COLUMBIA PLANOGRAPH CO., WASHINGTON, D. C.

H. H. CAMP, B. J. MAYNARD & B. P. WISE.
BENCH.
APPLICATION FILED OCT. 4, 1910.
1,000,070.
Patented Aug. 8, 1911.
2 SHEETS—SHEET 2.
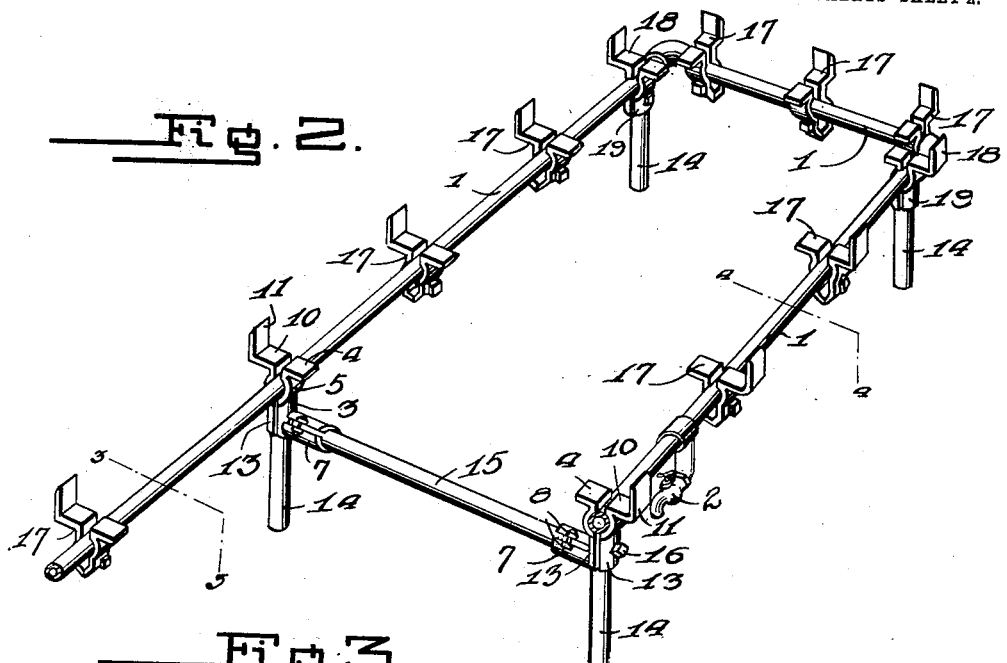
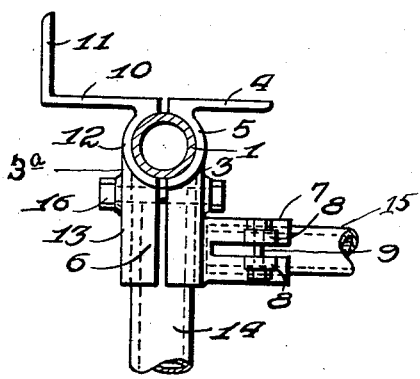

UNITED STATES PATENT OFFICE.

HENRY H. CAMP, BURTON J. MAYNARD, AND BYRON P. WISE, OF CLEVELAND, OHIO.

BENCH.

1,000,070.  Specification of Letters Patent.  Patented Aug. 8, 1911.

Application filed October 4, 1910. Serial No. 585,337.

*To all whom it may concern:*

Be it known that we, HENRY H. CAMP, BURTON J. MAYNARD, and BYRON P. WISE, citizens of the United States, residing at Cleveland, in the county of Cuyahoga and State of Ohio, have invented certain new and useful Improvements in Benches, of which the following is a specification, reference being had therein to the accompanying drawing.

This invention relates to benches for greenhouses and the principal object of the same is to provide a bench that will be strictly sanitary in that the same can be readily and thoroughly cleaned and, further, to provide a bench that can be readily assembled or taken apart and stored in compact form so that the minimum of storage space will be required.

In carrying out the objects of the invention generally stated above, it will be understood, of course, that the essential features thereof are necessarily susceptible of changes in details and structural arrangements certain preferred and practical embodiments of which are shown in the accompanying drawings, wherein—

Figure 1 is a fragmentary perspective view of the improved bench. Fig. 2 is a similar view of the supporting frame therefor. Fig. 3 is a fragmentary detail sectional view taken substantially on the line 3—3, Fig. 2. Fig. 4 is a detail sectional view taken on the line 4—4, Fig. 2.

Referring to the accompanying drawings by numerals, it will be seen that the improved bench comprises a supporting frame 1 that is preferably rectangular in shape and formed of coupled pipe sections which, in addition to providing a support for the body of the bench, also provide means for supplying water. At a suitable point, or points, the frame is tapped by a cock 2, by means of which the water for the plants can be readily obtained.

At suitable intervals, the frame 1 is embraced by clips upon which the body of the bench is supported, and some of said clips also serve as means for connecting the supporting posts to the frame and also provide means for carrying brace bars. The clips are formed of two members and the members of the clips which carry the posts and the braces are designated by the numerals 3 and 3ª. Clip member 3 has a flat top 4, an intermediate groove 5 and a pendent semi-tubular base 6 from which a laterally-projecting socket 7 projects. The socket 7 is longitudinally slotted, and the edges of said slot are provided with ears 8 that are connected by an adjusting screw 9 which obviously varies the diameter of said socket. Clip member 2 has a flat top 10 from the outer end of which a flat upright 11 projects. Said clip member 2 is provided with an intermediate groove 12 and a semi-tubular pendent lower portion 13, said groove 12 and tubular portion 13 corresponding to the similar parts of clip member 3; the two grooved portions of said members being engaged over opposite portions of the frame pipes. The semi-tubular lower portions form sockets for the supporting posts 14, and the laterally-projecting sockets of clip members 3 receive the ends of the transverse brace bars 15. The pendent semi-tubular portions of clips 3 and 3ª are adjustably connected by the adjusting screw 16 which regulate the clamping pressure of said portions on the supporting posts.

Intermediate clips 17 adjustably and detachably embrace the frame pipes in the same manner as the clips described in the foregoing and the upper portions thereof are of the same construction as said clips. Said clips 17 being solely for supporting the body of the bench, they are not provided with sockets.

In addition to the clips described other clips 18 are provided which carry similar means for supporting the body of the bench and are provided with a pendent socket 19 for the supporting posts. Said clips 17 are designed for use at the corners of the frame 1.

As described, it will be understood that all the clips are adjustably clamped to the frame 1 and said clips are provided with a flat top and the flat uprights. These upper structures form rests for right angular side and end members 20 of the body of the bench. Said members 20 are of plastic material and the bases thereof provide the supporting ledge for the inverted T-shaped bars 22. Said inverted T-shaped bars form the supports for the ends of the plastic slabs 21 which also separate said slabs. These inverted T-shaped bars may be protected from the moisture by the use of cement at ends of the plastic members 21.

It will be understood that the entire body of the bench can be readily removed from the frame 1, or parts thereof removed when necessary or desirable. It will also be understood that the bars 15 in addition to bracing the frame 1, can be used as supports to suspend the usual heating pipes.

What we claim as our invention is:—

1. A greenhouse bench comprising a frame formed of water-supplying pipes, posts for supporting said frame, a bench body composed of plastic body slabs and plastic end and side members, and adjustable clips carried by said frame for supporting said body.

2. A greenhouse bench comprising a supporting frame, supporting clips adjustably mounted on said frame, a body composed of a surrounding guard rail and bottom slabs, said rail being supported by said clips, and transverse bars supported by said rails and provided with longitudinal flanges upon which said slabs rest.

3. A greenhouse bench comprising a frame formed of water-supplying pipes, socket clips detachably fastened thereto and provided with post sockets and brace sockets, posts carried by the post sockets, braces carried by the brace sockets, rests carried by said clips, auxiliary clips adjustable on said frame, and provided with rests, plastic angular end and side guards carried by the seats of said clips, transverse bars supported by said guards, and bottom slabs formed of plastic material and supported by said transverse bars and angular guards.

4. A greenhouse bench comprising a frame, corner clips carried thereby and provided with an upper rest and a lower socket, supporting posts for said sockets, auxiliary clips carried by said frame and provided with an upper rest, post and brace holding clips also carried by said frame and provided with post and brace sockets and upper rests, posts and braces engaging said sockets, and a plastic body carried thereby and formed of removable angular end and side members and removable bottom slabs.

5. A green house bench comprising a frame, detachable supporting means therefor, a body formed of side members and removable bottom members that are supported by said side members, and adjustable seats carried by said frame for said side members.

6. A greenhouse bench comprising a frame, seats adjustably and removably mounted thereon, and a body carried by said seats and formed of removable side and body members.

In testimony whereof we hereunto affix our signatures in presence of two witnesses.

HENRY H. CAMP.
BURTON J. MAYNARD.
BYRON P. WISE.

Witnesses:
R. H. CREVOISIE,
GRANT LEE.

---

Copies of this patent may be obtained for five cents each, by addressing the "Commissioner of Patents, Washington, D. C."